March 9, 1926.                                                               1,575,820
J. W. CLOUD
FLUID PRESSURE BRAKE
Filed June 5, 1924
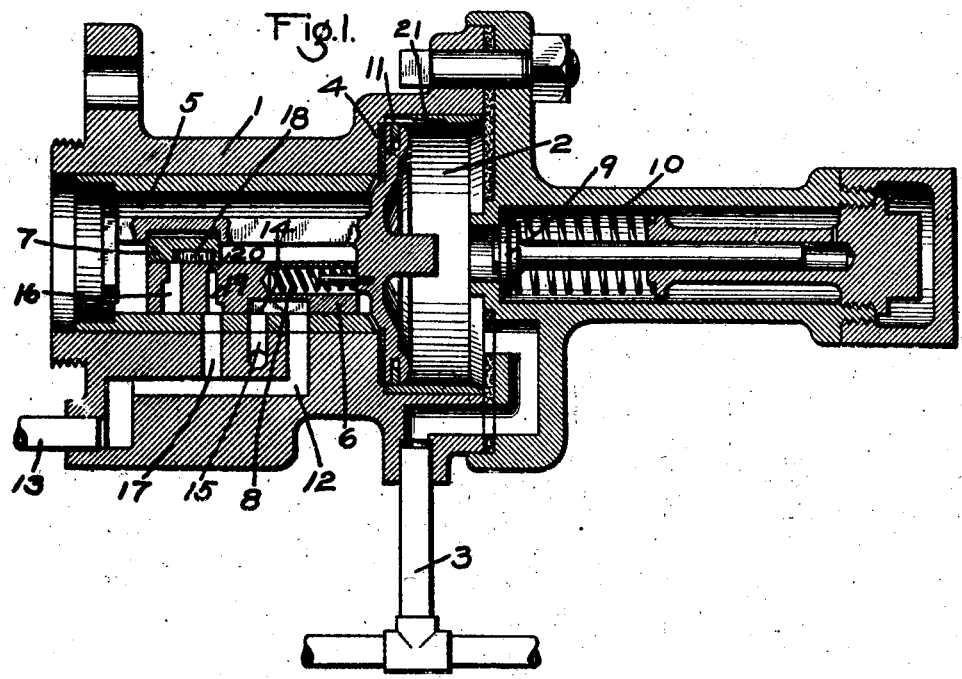
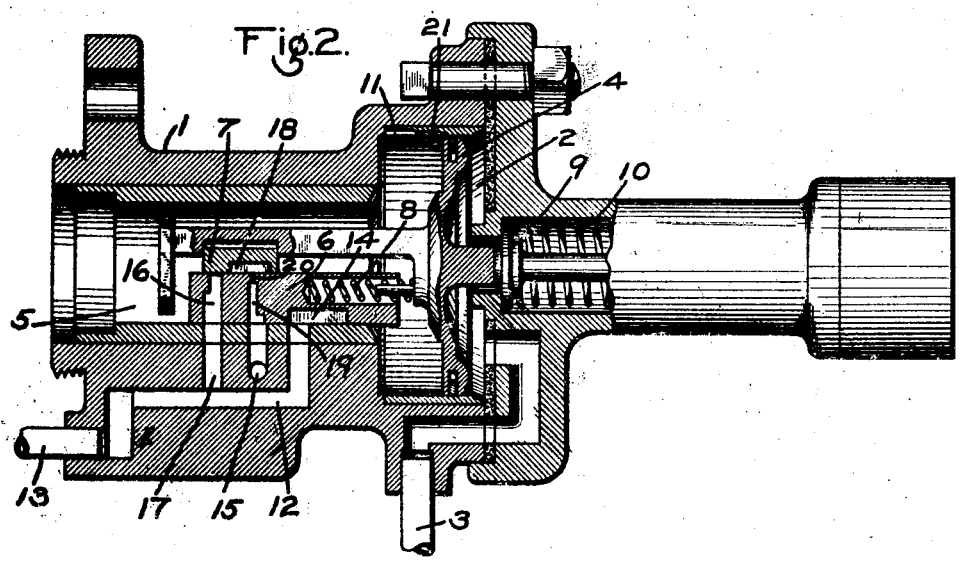
INVENTOR
JOHN W. CLOUD
BY *Wm. M. Cady*
ATTORNEY Patented Mar. 9, 1926.

1,575,820

UNITED STATES PATENT OFFICE.

JOHN W. CLOUD, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 5, 1924. Serial No. 717,919.

*To all whom it may concern:*

Be it known that I, JOHN W. CLOUD, a subject of the King of Great Britain and Ireland, residing at London, England, have invented a certain new and useful Improvement in Fluid-Pressure Brakes, of which the following is a specification.

This invention relates to fluid pressure brakes, and more particularly to a triple valve device.

The principal object of my invention is to provide a triple valve device having improved means whereby a graduated release of the brakes may be secured.

In the accompanying drawing; Fig. 1 is a central sectional view of a triple valve device embodying my improvement and showing the moving parts in normal full release position; and Fig. 2 a similar view, showing the triple valve in service lap position.

As shown in the drawing, the triple valve device may comprise a casing 1 having a piston chamber 2, connected to the usual brake pipe 3 and containing the usual triple valve piston 4. Valve chamber 5 at the opposite side of piston 4 contains a main slide valve 6 and a graduating slide valve 7 adapted to be operated by piston 4, the graduating valve 7 having a movement relative to the main valve 6.

Mounted in the main valve 6 and interposed between piston 4 and said valve is a coil spring 8 having sufficient force to move the piston 4 and the graduating valve 7 relatively to the main valve 6 under certain conditions.

A yielding stop member 9, subject to the pressure of an adjustable coil spring 10, tends to move the piston 4 from application position to lap position, as shown in Fig. 2.

In operation, when the brake pipe 3 is charged with fluid under pressure, fluid flows from piston chamber 2 through the usual feed groove 11 to valve chamber 5 and charges the auxiliary reservoir (not shown) which is connected to valve chamber 5 in the usual manner. In the release position of the triple valve device, as shown in Fig. 1, passage 12 leading to the usual brake cylinder pipe 13, is connected through cavity 14 in slide valve 6 with atmospheric exhaust port 15, so that the brake cylinder is now free of fluid pressure.

When the brake pipe pressure is reduced to effect an application of the brakes, the piston 4 is moved out by auxiliary reservoir pressure, first causing a movement of the graduating valve 7 relative to the slide valve 6 so as to uncover the service port 16 and then operating the main slide valve 6 to a position, as shown in Fig. 2, in which the port 16 registers with a port 17 leading to the brake cylinder passage 12, the final movement of piston 4 being yieldingly resisted by the spring stop member 9. Fluid under pressure is then supplied from the auxiliary reservoir to the brake cylinder and when the auxiliary reservoir pressure has been reduced by flow to the brake cylinder to a point slightly less than the reduced brake pipe pressure plus the pressure of spring 10, the piston 4 and the graduating valve 7 will be moved by the spring stop member 9 to lap position, as shown in Fig. 2, so that the further flow of fluid to the brake cylinder is cut off.

Further successive reductions in brake pipe pressure will cause the above operation to be repeated, as will be evident, so that the desired degree of brake cylinder pressure may be obtained.

If it is desired to effect a graduated release of the brakes, the pressure in the brake pipe is increased to a predetermined extent and thereby the piston 4 and the graduating slide valve 7 will be moved toward the left compressing the spring 8, the main valve 6 remaining stationary, in the position shown in Fig. 2. This movement of slide valve 7 causes cavity 18 therein to connect port 16 with port 19 having a restricted portion 20, and since port 19 now registers with exhaust port 15, fluid under pressure will be slowly vented from the brake cylinder. The piston 4 in this position, opens a restricted extension 21 of the feed groove 11, so that the auxiliary reservoir will be gradually recharged from the brake pipe at the same time that fluid is being vented from the brake cylinder.

As soon as the auxiliary reservoir pressure has been increased to a point nearly equal to the brake pipe pressure, the spring 8 will act to move the piston 4 and graduating valve 7 back to lap position, as shown in Fig. 2, cutting off the further release of fluid from the brake cylinder.

If it is desired to fully release the brakes, a greater increase in brake pipe pressure is effected, such that after the relative movement of piston 4 and graduating slide valve 7 has taken place, the main slide valve 6 will then be shifted to full release position, as shown in Fig. 1, in which the brake cylinder is connected to the exhaust port 15 through passage 12 and cavity 14.

Having now described my invention, what I claim as new and desire to secure by Letters Patent, is:

1. In a fluid pressure brake, the combination with a brake pipe, of a triple valve device having a main valve, a graduating valve having a movement relative to the main valve, a piston subject to brake pipe pressure for operating said valves to effect a graduated release of the brakes, and a spring interposed between the main valve and said piston.

2. In a fluid pressure brake, the combination with a brake pipe, of a triple valve device having a main valve, a piston subject to brake pipe pressure, a graduating valve movable by said piston relatively to the main valve in opposite directions from a normal position for respectively supplying and releasing fluid to and from the brake cylinder, and a spring tending to move said graduating valve to its normal position.

3. In a fluid pressure brake, the combination with a brake pipe, of a triple valve device having a main valve having a position for establishing communication with the brake cylinder, a piston subject to brake pipe pressure, an auxiliary valve mounted on the main valve and movable by said piston in one direction relatively to the main valve for supplying fluid to the brake cylinder and movable in the opposite direction for releasing fluid from the brake cylinder, and a spring tending to move said auxiliary valve to an intermediate lap position.

4. In a fluid pressure brake, the combination with a brake pipe, of a triple valve device having a main valve, a graduating valve having a movement relative to the main valve, a piston for operating said valves, and a spring interposed between said piston and main valve, the main valve being movable by said piston to a position for establishing communication with the brake cylinder and the graduating valve being movable relatively to the main valve for establishing communication from the brake cylinder to the exhaust, said spring tending to move the piston and graduating valve to a position for cutting off the exhaust from the brake cylinder.

In testimony whereof I have hereunto set my hand.

JOHN W. CLOUD.